Patented June 20, 1939

2,163,334

UNITED STATES PATENT OFFICE 2,163,334

OPACIFYING AGENTS FOR ENAMELS AND GLAZES

Ludwig Weiss, Frankfort-on-the-Main, Germany, assignor to Deutsche Gold und Silber Scheide-Anstalt, vormals Roessler, Frankfort-on-the-Main, Germany, a corporation of Germany No Drawing. Application January 5, 1938, Serial No. 183,517. In Germany December 9, 1936

9 Claims. (Cl. 106—36.2)

This invention relates to certain opacifiers for opacifying enamels and glazes. More particularly, it relates to certain opacifying agents which, when introduced into enamels or glazes, impart thereto a white, opaque color. It is also concerned with a method of utilizing the novel opacifying agents to produce white opaque glazes.

At present the oxides of zirconium, titanium, tin, and antimony are in extensive use as enamel opacifiers. The opacifying agents with which this invention is concerned, the basic sulfates of cerium with various degrees of hydration, possess definite advantages over the metallic opacifiers named.

In accordance with the present invention I utilize as the improved opacifying agents basic sulfates of cerium having various degrees of hydration which may be represented generally by the formula $4CeO_2 \cdot xSO_3 \cdot yH_2O$. As examples may be given the basic sulfates having formulae ranging from $4CeO_2 \cdot SO_3 \cdot H_2O$ to $4CeO_2 \cdot 3SO_3 \cdot H_2O$. Hydrated basic sulfates of intermediate composition are also utilizable.

These hydrated basic cerium sulfates possess an extraordinarily high opacifying effect when introduced into enamels and glazes. Relatively small amounts of the novel opacifying agents are sufficient to secure an opacity in the enamel of superior density and satisfactory whiteness.

It is possible to prepare the basic sulfates which I utilize for opacifying enamels and glazes by treating a suspension of cerium hydrate with an equivalent amount of sulfuric acid, separating the solution, and drying the solid residue. If desired, the product may be heated sufficiently to expel more or less of the water of hydration. Water of hydration may be expelled by heating in sufficient amount to form any desired final product.

In addition to the basic sulfates of cerium, small amounts of other basic compounds such as the alkali metal or alkaline earth metal salts of silicic acid, or the aluminum salts of silicic acid may also be incorporated in the opacifier. If desired, mixtures of the various alkali metal and alkaline earth metal salts of silicic acid, as well as aluminum silicate, may be employed in conjunction with the basic sulfates of cerium. For example, water glass (sodium silicate) may be advantageously added to the hydrated basic sulfate of cerium oxide which is utilized as the opacifying agent.

The opacifying effect of the hydrated basic sulfates is at least equivalent to that of stannic oxide. For example, 2% of the basic sulfates as described will give substantially the same opaquing effect as 2% of stannic oxide. This is indeed remarkable as the hydrated basic sulfates, when present in the amount of 2% in the mill frit, impart thereto less than 1% of ceric oxide $(CeO_2)$.

As an example of the use of my novel opacifying agents, the following may be given:—

Example

An opacifying agent of the type described having a composition, by weight, equivalent to 47.6 parts of $CeO_2$, 17.3 parts of $SO_3$, 8.3 parts of $SiO_2$, 2.5 parts of $Na_2O$ and 24.3 parts of $H_2O$ was prepared. 200 grams of this opacifying agent was then ground in a ball mill with 10 kilograms of a frit having the composition:

| | Parts |
|---|---|
| $SiO_2$ | 51.55 |
| $Al_2O_3$ | 8.50 |
| $CaF_2$ | 1.75 |
| $Na_3AlF_6$ | 14.60 |
| $Na_2B_4O_7$ | 13.15 |
| $Na_2O$ | 6.80 |
| $K_2O$ | 3.65 |

The product was then mixed with 6% of enamelling clay, applied in the usual way to a twice treated metal sheet containing a ground enamel coat, and fired. The opacifying effect obtained in this manner with 0.95% of cerium oxide was substantially equivalent to the opacifying effect obtained with 2% of stannic oxide.

It should be understood that the various details hereinbefore given are to be regarded as illustrative and not restrictive, the scope of my invention being determined in accordance with the appended claims.

I claim:

1. An enamel opacifying agent comprising a basic sulfate of cerium having a formula ranging from $4CeO_2 \cdot SO_3 \cdot H_2O$ to $4CeO_2 \cdot 3SO_3 \cdot H_2O$, together with one or more of the basic silicates, selected from the group consisting of the alkali metal silicates, the alkaline earth metal silicates and the aluminum silicates.

2. An enamel opacifying agent which comprises a hydrated basic sulfate of cerium and an alkali metal silicate.

3. An enamel opacifying agent which comprises a hydrated basic sulfate of cerium and one or more of the basic silicates selected from the group which consists of the alkali metal silicates, the alkaline earth metal silicates and the silicates of aluminum.

4. A method of opacifying an enamel or glaze which comprises incorporating therein a small amount of a hydrated basic sulfate of cerium.

5. A method of opacifying an enamel or glaze which comprises incorporating therein a small amount of a hydrated basic sulfate of cerium having the formula $4CeO_2 \cdot xSO_3 \cdot yH_2O$.

6. A method of opacifying an enamel or glaze which comprises incorporating therein a small amount of a hydrated basic sulfate of cerium having a composition ranging from that represented by $4CeO_2 \cdot SO_3 \cdot H_2O$ to that represented by $4CeO_2 \cdot 3SO_3 \cdot H_2O$.

7. A process as defined in claim 6 wherein there is present, in addition to the hydrated basic sulfate of cerium, a small amount of a basic compound of an alkali metal or alkaline earth metal or of aluminum, or two or more of said basic compounds.

8. An enamel opacifying agent comprising a hydrated basic sulfate of cerium and a small amount of a basic compound of the alkali metals, alkaline earth metals or of aluminum or two or more of these basic compounds.

9. An enamel opacifier as defined in claim 8 which comprises silicic acid or a salt thereof.

LUDWIG WEISS.